United States Patent [19] [11] Patent Number: 4,949,593
Vignoli et al. [45] Date of Patent: Aug. 21, 1990

[54] AXIALLY RECIPROCATABLE CONTROL ROD

[75] Inventors: Terenzio Vignoli, Bologna; Daniele Fantelli, Baricella, both of Italy

[73] Assignee: SASIB S.p.A., Bologna, Italy

[21] Appl. No.: 39,215

[22] Filed: Apr. 17, 1987

[30] Foreign Application Priority Data

Jun. 6, 1986 [IT] Italy ............................ 15186/86[U]

[51] Int. Cl.⁵ ............................ G05G 1/00; F16P 1/00
[52] U.S. Cl. ........................................ 74/566; 74/608; 74/615
[58] Field of Search ................. 74/608, 566, 609, 503, 74/615, 606, 579 R; 150/52 R; 184/24, 25, 6.27, 109, 5; 53/148, 149, 150, 151; 198/468.9, 468.01, 468.11, 747

[56] References Cited

U.S. PATENT DOCUMENTS

| 1,447,984 | 3/1923 | Howard | 198/468.11 X |
| 2,903,840 | 9/1959 | Teupel et al. | 74/608 |
| 3,593,822 | 7/1971 | Wilcox | |
| 3,718,209 | 2/1973 | Moslo | 184/5 |
| 3,920,098 | 11/1975 | Schroeder | 184/5 |
| 3,958,498 | 5/1976 | Payne | 131/92 X |
| 3,985,404 | 10/1976 | Plaza et al. | 184/5 X |
| 4,134,502 | 1/1979 | Seragnoli | |
| 4,229,137 | 10/1980 | Mollins | |
| 4,306,648 | 12/1981 | Manservise | |
| 4,633,653 | 1/1987 | Roberts et al. | 53/545 |
| 4,676,360 | 6/1987 | Mattei et al. | 198/377 |

FOREIGN PATENT DOCUMENTS

| 11860 | 2/1928 | Australia | 74/579 R |
| 0248180 | 12/1987 | European Pat. Off. | |
| 115422 | 4/1900 | Fed. Rep. of Germany | |
| 709327 | 8/1931 | France | |
| 941291 | 7/1949 | France | |
| 1061235 | 4/1954 | France | |
| 201402 | 7/1983 | German Democratic Rep. | 74/608 |
| 67047 | 12/1950 | Netherlands | |
| 835710 | 6/1981 | U.S.S.R. | 74/608 |
| 13323 | 6/1902 | United Kingdom | 184/6.27 |
| 701494 | 12/1953 | United Kingdom | 184/24 |
| 1227774 | 4/1971 | United Kingdom | |

Primary Examiner—Rodney M. Lindsey
Attorney, Agent, or Firm—Spencer & Frank

[57] ABSTRACT

An axially reciprocatable control rod which is slidably fitted in a supporting tube protruding into the interior of a box-like structure containing the lubricated mechanical members for driving the rod. An oil guard sleeve extending toward the supporting tube has one end secured to the inward section of the control rod which protrudes from the supporting tube into the interior of the box-like structure, and has its opposite open end fitted over the supporting tube, so as to be longitudinally slidable therealong. the oil guard sleeve covers and protects that section of the control rod which protrudes from the supporting tube into the interiro of the box-like structure against any oil splashes.

4 Claims, 2 Drawing Sheets

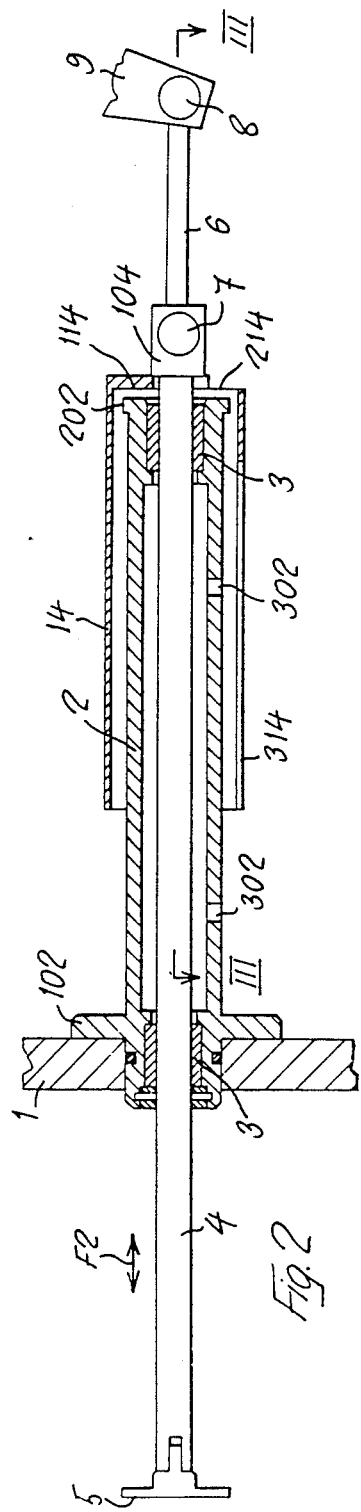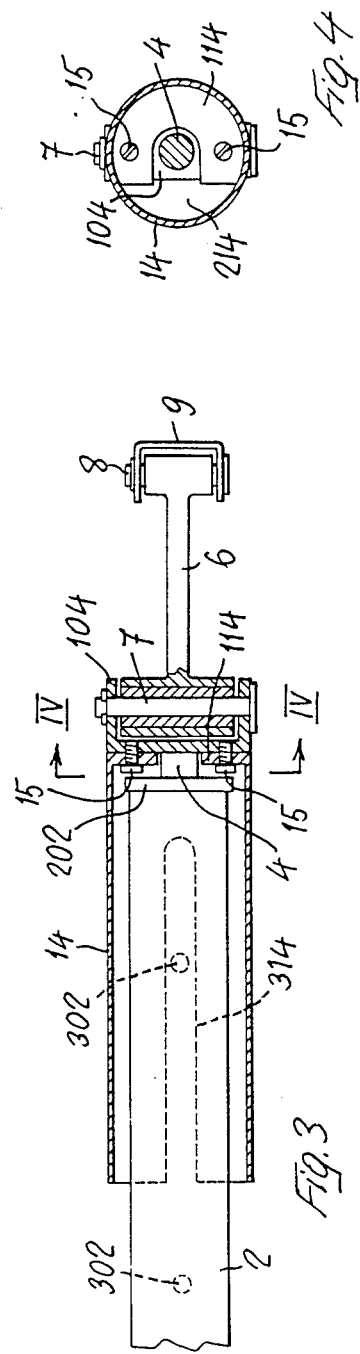

AXIALLY RECIPROCATABLE CONTROL ROD

SUMMARY OF THE INVENTION

The invention refers to an axially reciprocatable control rod which is slidably fitted, for example, by means of two bushings in a supporting tube protruding into the interior of a box-like structure containing the lubricated mechanical members for driving the rod.

A rod of the above stated type is used for controlling certain operating members of any processing machine, particularly for controlling pushing, bending, transferring means, or the like, in a packing machine and expecially in a cigarette-making machine, or the like. With these machines, there is generally the need of avoiding that the articles being processed be soiled by the lubricating oil used for the mechanical members. For this purpose the control rod slides in self-lubricating bushings whereby a direct lubrication of the rod is not needed. The control rod drives mechanical members contained in the box-like structure. These mechanical members can include for example, cams, rollers, shafts, gearings, levers, crank mechanisms, trunnions, fulcrum pivots, and the like. These mechanical members require oil lubrication, for example, a bath lubrication, or a spray lubrication by means of small distributing pipes fed by a suitable circulating pump. It is then inevitable that the control rod will be soiled by oil splashes thrown thereupon by the moving adjacent driving members immersed in the lubricating oil, or sprayed therewith through small distributing pipes at the interior of the box-like structure. Consequently, notwithstanding that there is no direct lubrication of the control rod, and in spite of the use of self-lubricating bushings in the supporting tube, any oil which accidentally deposits on the rod at the interior of the box-like structure spreads along the rod owing to its axially reciprocating motion. This includes repeated applications of even a small quantity of oil. This oil unavoidably leaks out of the outward end of the rod-supporting tube, thus causing an undesired soiling of the articles being processed. Such an oil leakage cannot be practically avoided even with the provision of seals and scraper rings.

The invention aims to eliminate the above-stated drawback, and to prevent any lubricating oil from leaking out of the control rod-supporting tube that may soil the articles being processed in a processing machine.

To this end an oil guard sleeve, extending toward the supporting tube, has one end secured to the inward section of the control rod which protrudes from the supporting tube into the interior of the box-like structure, and has its opposite open end fitted over the supporting tube, so as to be longitudinally slidable therealong. The oil guard sleeve is located in such a manner that the oil guard sleeve always covers and protects the control rod from any oil splashes in the portion of the control rod which protrudes from the end of the supporting tube into the interior of the box-like structure.

Thus, the oil guard sleeve according to the invention protects the rod against any oil splashes in the interior of the box-like structure. This prevents oil used to lubricate the driving members in the box-like structure from becoming accidentally deposited on the control rod. Thus, the oil is prevented from leaking out along the rod through the bushings in which the rod slides, and through any possible barriers (such as scraper rings, seals, and the like).

BRIEF DESCRIPTION OF THE DRAWINGS

These and other features of the control rod according to the invention will be described in connection with the annexed drawings, in which:

FIG. 2 is a longitudinal sectional view showing the same control rod, in the position in which it is extended out of the box.

FIG. 3 is a longitudinal sectional view taken on line III—III in FIG. 2.

FIG. 4 is a cross-sectional view taken on line IV—IV in FIG. 3.

DESCRIPTION OF THE PREFERRED EMBODIMENT

Figure 1:
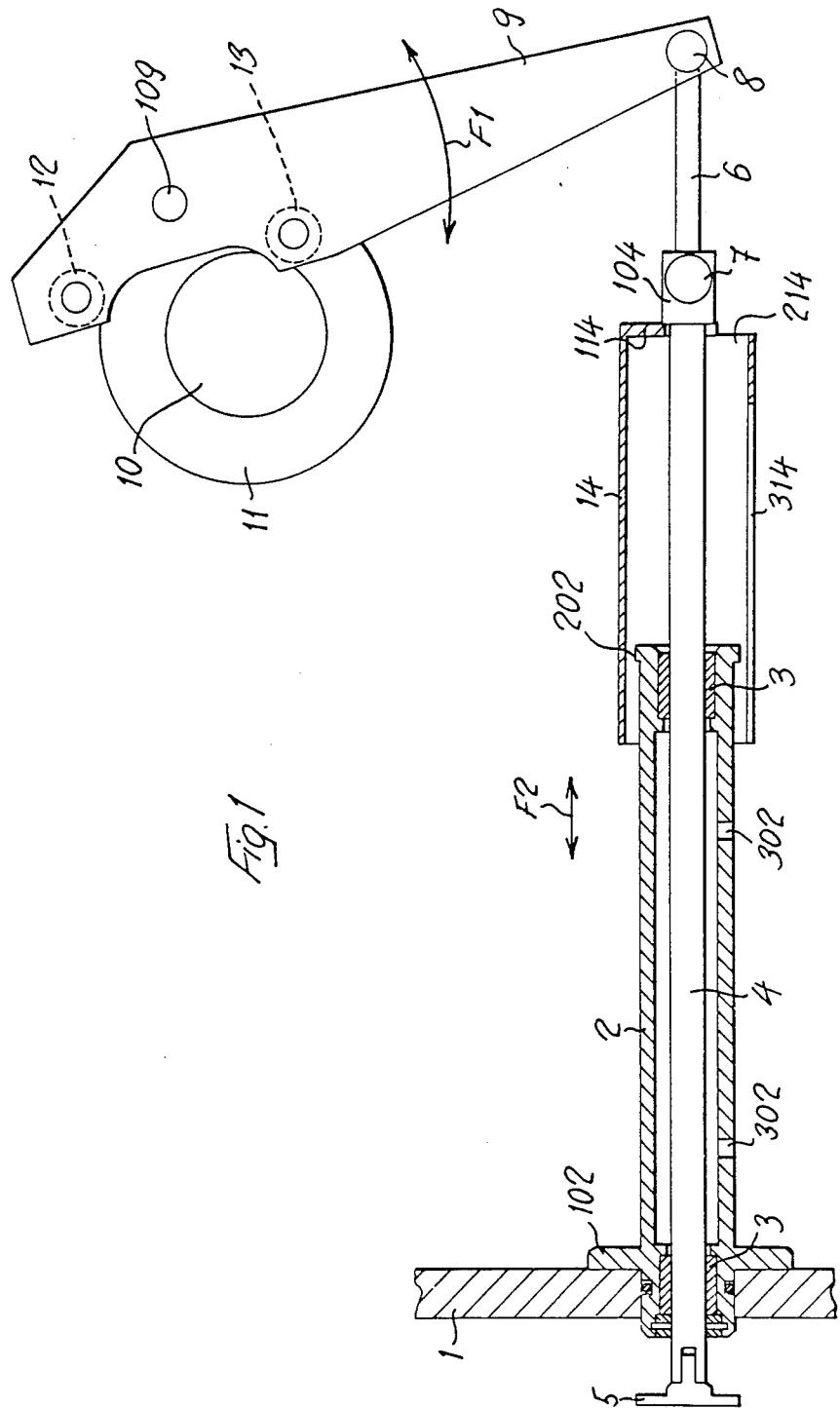
FIG. 1 is a longitudinal sectional view showing a control rod according to the invention, in the position in which it is retracted into the associated box.

In the figures, reference numeral 1 denotes the wall of a box or housing into the interior of which there protrudes a supporting tube 2 which passes through the wall 1 and is secured thereto by means of a flange 102. Fitted in tube 2 are the self-lubricating bushings 3 in which the middle portion 108 of the control rod 4 is axially slidably mounted. The outward portion 106 of the control rod 4, which is out of the box, carries an operating member of any processing machine, for example, a pusher 5 of a cigarette-packing machine. The inward portion 110 of rod 4, which the middle portion of 108 of protrudes into the interior or chamber defined by the housing has a fork-shaped end 104. By means of an intermediate link 6 and of pivots 7, 8, the control rod 4 is pivotally connected to a driving lever 9 which is fulcrumed about point 109 on a suitable support (not shown) in the interior of the box. The driving lever 9 is caused to swing about its fulcrum point 109 in the direction of the double arrow F1, by means of a pair of cams 10, 11 with which the rollers 12, 13 mounted onto the driving lever 9 cooperate. Thus, the control rod 4 is imparted an axially reciprocating motion in the direction of the double arrow F2.

The cams 10, 11 the rollers 12, 13 and the pivots 7, 8 are sprayed in known manner with lubricating oil by means of small distributing pipes (not shown).

In order to prevent the control rod 4 from being soiled by any splashes of lubricating oil, a cylindrical oil guard sleeve 14 extending toward the wall 1 over the supporting tube 2, is secured to the inward end 104 of rod 4. The oil guard sleeve 14 is freely slidable in the longitudinal direction relative to the supporting tube 2, since its inside diameter is greater than the outside diameter of the tube 2. The oil guard sleeve 14 is of a rigid construction and is so long that it always covers that section of rod 4 which protrudes from the supporting sleeve 2 into the interior of the box. In other words, when the rod 4 is in its fully retracted position inside the box, the oil guard sleeve 14 still has a certain portion disposed over the supporting tube 2, as shown in FIG. 1, and it does not abut against the wall 1 when the rod 4 is in its fully extended position outside of the box, as shown in FIG. 2.

The oil guard sleeve 14 includes an end plate 114 which is secured to the fork-shaped end 104 of rod 4 by means of screws 15. This end plate 114 of the oil guard sleeve 14 is shaped similar to a horseshoe such that it has an aperture 214. This aperture 214 is for avoiding any air pumping phenomenon due to the simultaneous quick axially reciprocating motion of the oil guard sleeve 14 and the control rod 4, relative to the stationary supporting tube 2. Moreover, any oil which may drip down from the supporting tube 2 into the oil guard sleeve 14, can be drained through the aperture 214. For the same purposes (free circulation of air and oil drainage), the oil guard sleeve 14 has in its lower portion a longitudinal slot 314. The oil guards sleeve 14 may also have one or more holes in its lower portion in place of the longitudinal slot 314.

Corresponding to its inward free end, the supporting tube 2 has an external wide collar 202 that forms a sort of barrier preventing the oil from dripping down from tube 2 onto the control rod 4. In its lower portion, preferably corresponding to the longitudinal slot 314 in the oil guard sleeve 14, the supporting tube 2 is provided with one or more holes 302 for letting out any oil which may seep into the tube 2.

Of course, the present invention comprises also those models attaining a same utility by using the same innovative conception. For example, the control rod 4 may be driven by any other means which is different from the swinging lever 9 and the pair of cams 10, 11.

We claim:

1. An apparatus for processing articles comprising:
a housing having an interior, an exterior and at least one wall; a support tube disposed in said housing with one end connected to said wall of said housing, said support tube including an external collar located on the other end of said support tube, a lower portion provided with at least one hole for oil drainage, and at least one self-lubricating bushing disposed therein;
an axially movable horizontally disposed control rod extending through said wall and said support tube such that said control rod has an outward portion extending externally from said housing, a middle portion located within said support tube and an inward portion extending inwardly into said housing beyond said support tube, said middle portion of said control rod being supported by said at least one bushing;
mechanical means for driving said control rod wherein the respective lengths of said outward and inward portions change as said control rod is driven axially by said mechanical means, said mechanical means being located within said housing and connected to said control rod at the end of said control rod located within said housing; and
an axially movable oil guard sleeve means for preventing oil from splashing onto said inward portion of said control rod, said oil guard sleeve means being disposed within said housing and having a portion extending coaxially around a portion of said support tube so that said oil guard sleeve means overlaps and is spaced from said support tube during the entire axial movement of said control rod, said oil guard sleeve means including:
a lower portion provided with means for allowing oil removal from said oil guard sleeve means,
an end plate having a lower portion provided with at least one aperture, said end plate being connected to the end of said control rod disposed in said chamber so that said oil guard sleeve means moves with said control rod, whereby oil used to lubricate said mechanical means is prevented by said oil guard sleeve means from soiling articles being processed.

2. An apparatus as defined in claim 1, wherein said means for allowing oil removal is at least one hole formed in the lower portion of said oil guard sleeve means.

3. An apparatus as defined in claim 1, wherein said means for allowing oil removal is a longitudinal slot formed in the lower portion of said oil guard sleeve means.

4. An apparatus for processing articles comprising:
a housing having an interior, an exterior and at least one wall;
a support tube disposed in said housing with one end connected to said wall of said housing, said support tube including an external collar located on the other end of said support tube, a lower portion provided with at least one hole for oil drainage, and at least one self-lubricating bushing disposed therein; an axially movable horizontally disposed control rod extending through said wall and said support tube such that said control rod has a outward portion extending externally from said housing, a middle portion located within said support tube and a inward portion extending inwardly into said housing beyond said support tube, said middle portion of said control rod being supported by said at least one bushing;
mechanical means for driving said control rod wherein the respective lengths of said outward and inward portions change as said control rod is driven axially by said mechanical means, said mechanical means being located within said housing and connected to said control rod at the end of said control rod located within said housing; and
an axially movable oil guard sleeve means for preventing oil from splashing onto said inward portion of said control rod, said oil guard sleeve means being disposed within said housing and having a portion extending coaxially around a portion of said support tube so that said oil guard sleeve means overlaps and is spaced from said support tube during the entire axial movement of said control rod, said oil guard sleeve means including:
a lower portion provided with means for allowing oil removal from said oil guard sleeve means, said means for allowing oil removal comprising at least one of a hole and a slot formed in the lower portion of said oil guard sleeve means, and
an end plate having a lower portion provided with at least one aperture, said end plate being connected to the end of said control rod disposed in said chamber so that said oil guard sleeve means moves with said control rod whereby oil used to lubricate said mechanical means is prevented by said oil guard sleeve means from soiling the articles being processed.

* * * * *